United States Patent Office 2,848,082
Patented Aug. 19, 1958

2,848,082

CLUTCH AND BRAKE UNIT FOR PRESSES

Roy F. Dehn, Wickliffe, Ohio, assignor to The Cleveland Crane & Engineering Company, Wickliffe, Ohio, a corporation of Ohio Application November 4, 1954, Serial No. 466,813

4 Claims. (Cl. 192—12)

The present invention relates to presses and the like and, more particularly, to intermittently operated presses or the like having driving means including a flywheel journalled on a shaft, a clutch for drivingly connecting the flywheel to the shaft, and a brake for stopping the rotation of the shaft when disconnected from the flywheel.

The principal object of the present invention is the provision of a new and improved press or the like having power transmission means removable as a unit to facilitate replacement and repair, and which unit comprises a removable drive shaft section having a flywheel journalled thereon, and a clutch for drivingly connecting the flywheel to the shaft section.

Another object of the present invention is the provision of a new and improved press or the like having a drive shaft and a removable power transmission and braking unit comprising a shaft section connected into the drive shaft as a part thereof, a flywheel, a clutch for drivingly connecting the flywheel to the shaft section, and a brake for stopping the rotation of the shaft section.

A further object of the present invention is the provision of a new and improved press or the like having a drive shaft and power transmission means for the drive shaft removable as a unit to facilitate replacement and repair comprising a shaft section adapted to be connected into the drive shaft of the press as a part thereof, a flywheel journalled on the shaft section, and a fluid pressure operated clutch for drivingly connecting the flywheel to the shaft section, the drive shaft of the press and the removable unit being so constructed and arranged that pressure fluid for operating the clutch is supplied through the drive shaft and the shaft section.

Another object of the present invention is the provision of a novel and improved drive unit for presses and the like comprising a flywheel journalled on a shaft section and clutch and brake means for respectively connecting the flywheel to the shaft section and for stopping the rotation of the shaft section.

The invention resides in certain constructions and combinations and arrangements of parts and further objects and advantages will be apparent to those skilled in the art to which it relates from the following description of the prefered embodiment described with reference to the accompanying drawings forming a part of this specification, in which Fig. 1 is a front elevational view of a punch press embodying the present invention;

Figure 1:
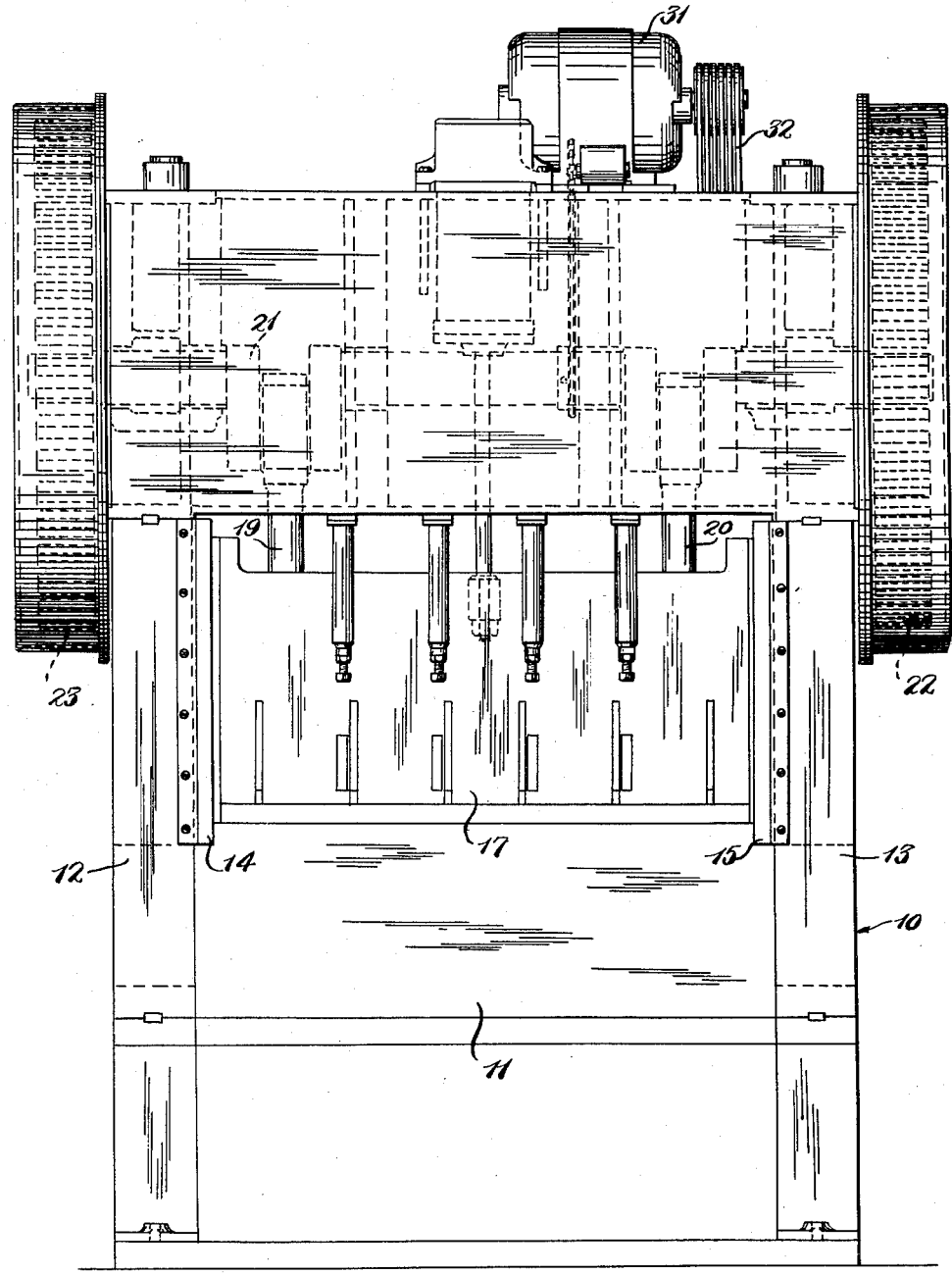
Figure 2:
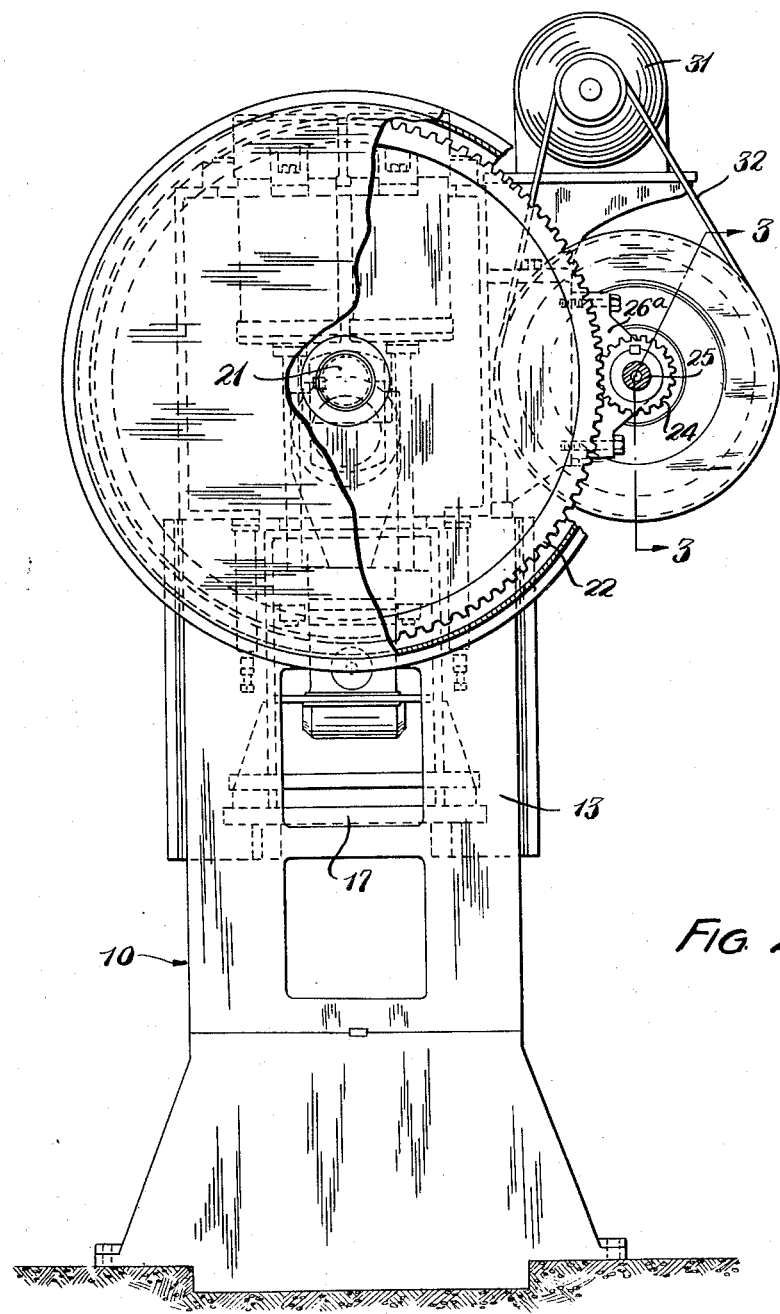
Fig. 2 is a side elevational view of the punch press of Fig. 1 with certain parts thereof broken away.

Although the invention is susceptible of various modifications and uses, it is particularly suitable for use in presses having intermittently reciprocated rams or punches, and for purposes of illustration it is herein shown embodied in a power punch press. The punch press generally comprises a frame 10 including a bed 11 having uprights 12, 13 at opposite sides thereof. The uprights 12, 13 have guideways 14, 15 respectively attached thereto for guiding a ram or punch 17, in its vertical reciprocating movement. The ram 17 is reciprocated by pitmans 19, 20 pivotally connected to the ram and to the cranks of a shaft 21 journalled in the upper portions of the uprights 12, 13. The crankshaft 21 is driven by two bull gears 22, 23 which are attached to the opposite ends thereof. The bull gears 22, 23 are driven by pinions 24, only one of which is shown in the drawings, attached to a drive shaft 25 supported adjacent its ends by two bearing blocks 26a, only one of which is shown in the drawings, attached to the uprights 12, 13 respectively.

According to the present invention, the drive shaft 25 is rotated by power transmission means removable as a unit and comprising a shaft section 27, a flywheel 28 journalled on the shaft section, and a clutch C for drivingly connecting the flywheel 28 to the shaft section. In the preferred embodiment the removable unit also includes a brake for stopping the rotation of shaft section 27 when it is disconnected from the flywheel. The shaft section 27 is connected into the drive shaft 25 to form a part thereof by couplings 29, 30 for the opposite ends respectively of the shaft section 27.

The flywheel 28 is adapted to be driven by a motor 31 supported on the upper portion of the frame 10, through a belt drive 32 and is preferably journalled on the shaft section 27 by means of spaced antifriction bearings 33, 34. At least one of the bearings 33, 34 is preferably of the type which secures the flywheel 28 against axial movement with respect to the shaft section 27. In the illustrated embodiment the antifriction bearing 33 is illustrated as comprising a roller bearing having an inner race 35 secured to the shaft section and an outer race 36 secured to the flywheel. Balls or rollers 37 intermediate the races 35, 36 roll on parallel surfaces 38, 39 respectively which are reversedly inclined with respect to the axis of the shaft to thereby hold the flywheel 28 against axial movement.

Figures 3, 4:
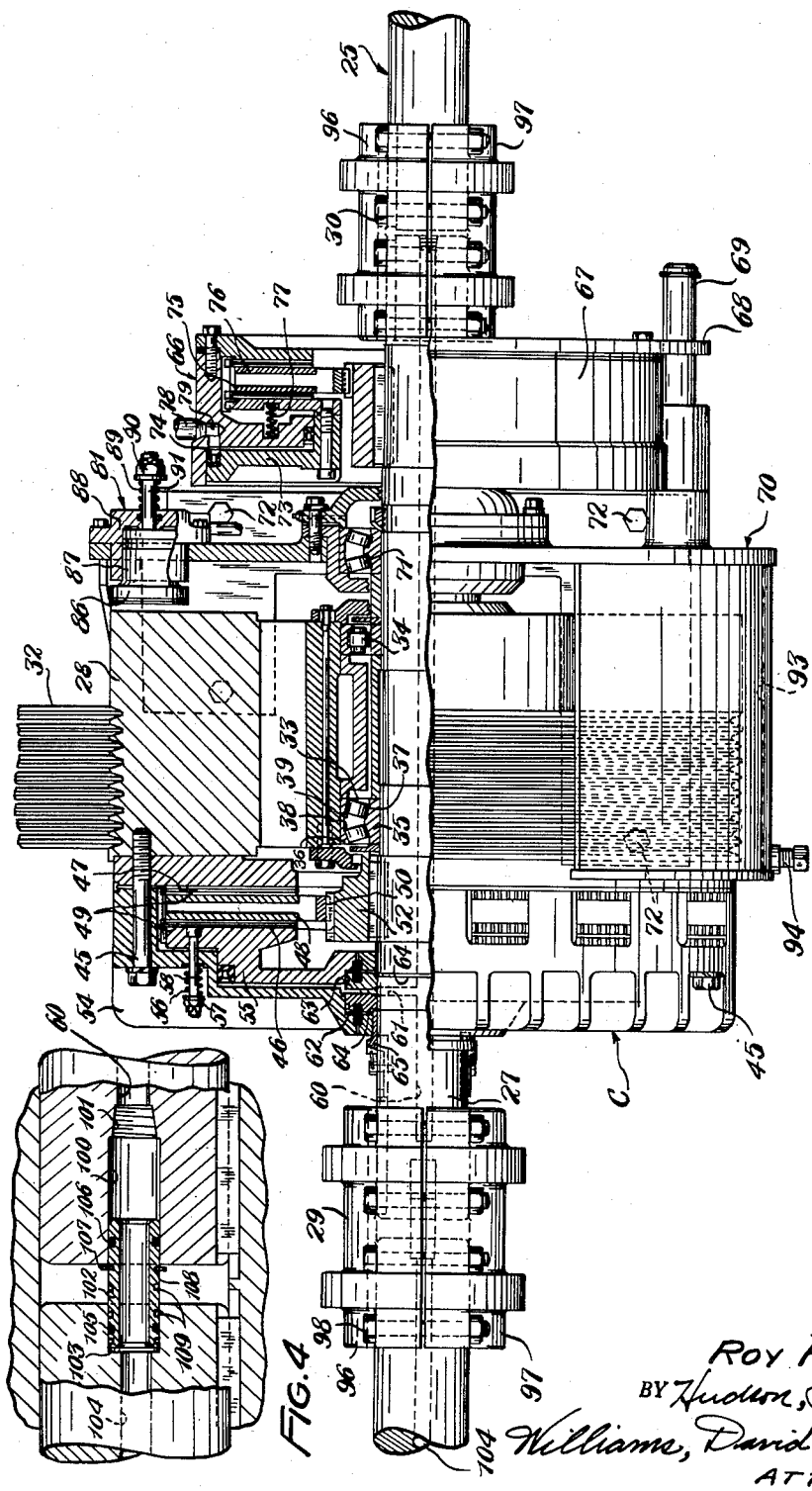
Fig. 3 is a fragmentary view of the removable driving unit for the press of Fig. 1 with parts thereof in section.
Fig. 4 is a fragmentary view with parts broken away showing the air seal between the axial bores of the drive shaft and the removable shaft section.

The flywheel 28 is drivingly connected to the shaft section 27 by the clutch C coaxial with the shaft section 27 and detachably connected to the left side of the flywheel 28 as it is viewed in Fig. 3 by bolts 45. The clutch C, in the illustrated embodiment, is of the fluid pressure type and generally comprises annular driving clutch plates or elements 46, 47 and a driven clutch element 48 supported for relative axial movement along the shaft section 27 to clutch engaged and disengaged positions. Clutch disks 49, each preferably comprised of segments, are located intermediate the clutch plates. The driven clutch element 48 is splined to the shaft section 27 by means of spline teeth about the periphery of its central opening 50 which cooperate with spline teeth about the periphery of a hub 52 keyed to the shaft section 27. The movable driving plate 46 and the clutch disks 49 are splined to the internal wall of a cylindrical housing 54 for the clutch, the housing being formed so as to provide a piston chamber in which a piston 55 is reciprocable to move the clutch plates to engaged and disengaged positions. The right hand side of the piston 55 as it is viewed in Fig. 3 is smooth and forms the movable driving plate 46. The piston 55 is spring biased to a clutch released position by means of a spring 56 interposed between the housing 54 and a nut 57 threaded onto the end of a bolt 58 carried by the piston 55. Fluid pressure for actuating the piston against the action of spring 56 is supplied intermediate the piston 55 and the housing 54 from an axial bore 60 in the shaft section 27. The axial bore 60 communicates with the piston chamber through a passage 61 which opens into the piston chamber intermediate annular sealing rings 62, 63 supported coaxially with the shaft section 27 by the housing 54 and the piston 55 respectively. The rings 62, 63 cooperate with valve seats 64 formed by shoulders on a movable ring 65 and on the shaft section 27 respectively to form a seal and prevent the escape of fluid pressure along the shaft section 27.

Upon disengagement of the clutch C the rotation of the shaft section 27 and the drive shaft 25 is adapted to be stopped by means of a brake 66 coaxial with the shaft section 27 adjacent the right hand side of the flywheel 28 as viewed in Fig. 3. Brake 66 comprises a cylindrical housing member 67 having bosses 68 with openings therethrough for receiving pins 69 for connecting the brake to a support bracket 70. The support bracket 70 is journalled on the shaft section 27 by suitable antifriction means 71, similar, in the illustrated embodiment, to the roller bearing 33 described above to hold the support bracket against axial movement with respect to the shaft section 27. The support bracket 70 is adapted to be connected to the frame 10 by means of bolts 72.

In the preferred embodiment the brake 66 is of the fluid pressure actuated type and has a piston 73 operable in a piston chamber 74 formed by the housing member 67 to actuate annular brake elements 75, 76. The brake elements 75 are disposed on opposite sides of the brake element 76 and are splined to the internal wall of the housing member 67 while the brake element 76 is splined to the shaft. The elements 75 and 76 are biased to their engaged position by means of a spring 77 interposed intermediate the housing 67 and the elements. Fluid is supplied to the piston chamber for operating the piston 73 to move the brake elements to their disengaged positions through a pipe 78 connected to a passage 79 formed in the housing member 67 and communicating with the piston chamber.

The support bracket 70 mounts an auxiliary flywheel brake 81 for stopping the rotation of the flywheel. The auxiliary flywheel brake 81 comprises a braking member 86 supported on the end of a piston 87 operable in a cylinder 88 supported by the support bracket 70 to engage the flywheel. The flywheel brake 81 is spring biased to a brake released position by a spring 89 which engages a nut 90 threaded onto a rod 91 extending from the piston 87 outwardly through the end of cylinder 88. The flywheel brake is operated when it is desired to stop the flywheel by introducing fluid pressure into the cylinder 88.

The support bracket 70 also includes a flywheel guard member 93 adapted to encompass the lower portion of the flywheel 28. The guard member 93 is provided with a depending screw 94 whose purpose will be set forth hereinafter.

The removable shaft section 27 is connected into the drive shaft 25 by couplings 29, 30 each comprising two members 96, 97 which are adapted to be bolted together over the ends of drive shaft 25 and the shaft section 27 by bolts 98 to clamp the shaft section 27 in a coaxial alignment with the drive shaft 25.

As illustrated in Fig. 4, the axial bore 60 of the shaft section 27 opens into a counterbore 100 through a tapered threaded bore 101. The counterbore 100 communicates with the left hand end of the shaft section 27 and is adapted to receive a sleeve 102 for connecting the counterbore 100 with a counterbore 103 of an axial shaft bore 104 extending through the left hand portion of the crankshaft 25 as viewed in Fig. 3. The counterbore 103 is adapted to receive the sleeve 102, the sleeve being provided with O-rings 105, 106 to form a seal between the counterbores 103, 100 respectively. The counterbore 100 is of a length to receive approximately the entire length of the sleeve 102 and the movement of the sleeve 102 into counterbore 100 is limited by means of a snap ring 107 adapted to be received in a peripheral groove 108 in the sleeve 102. The sleeve 102 is also provided with additional peripheral grooves 109 to the left of the groove 108.

When the shaft section 27, with the flywheel, clutch and brake thereon, is being connected to the drive shaft 25, the sleeve 102 may be pushed into the counterbore 100 to a point where it does not extend appreciably from the counterbore by removing snap ring 107. This will permit the alignment of the shaft section 27 intermediate the ends of the drive shaft 25 and the coupling 30 put into place. After the coupling 30 is in place the sleeve 102 may be worked out of the bore 100 and into a position as shown in Fig. 4 by means of a tool adapted to fit in the peripheral grooves 109. After the sleeve 102 has been properly positioned the snap ring 107 may be put in place and the coupling 29 applied to connect the adjacent ends of the shaft section 27 and the drive shaft 25.

After the flywheel, brake, and clutch unit is in position with the shaft section 27 connected into the drive shaft 25 as a part thereof, fluid pressure may be supplied to the axial bore 60 of the shaft section through the bore 104 of the drive shaft 25. The right hand end of the shaft section 27 as it is viewed in Fig. 3 is threaded so that it may be plugged when fluid pressure is being supplied to the axial bore 60 from the bore 104. At times it may be convenient to plug the left hand end of the section 27 and supply air pressure to the right hand end of the shaft section. In this event, the left hand end of shaft section 27 may be plugged by means of a member threaded into the threaded bore 101.

It may now be seen that the present invention provides a driving means removable as a unit and comprising a flywheel journalled on a shaft section, a clutch for drivingly connecting the flywheel to the shaft section and, preferably, a brake for stopping the rotation of the shaft section. The present construction not only provides a convenient means for replacing or repairing the driving unit but also permits easy replacement of the belts in the belt drive 32. These belts may be replaced without removing the unit by unbolting the coupling 29 to drop the left hand end of the unit as viewed in Fig. 3. Belts to be replaced and the new belts may then be slipped over this end of the unit. During the replacing operation the unit may be supported by means of the set screw 94. It is also apparent from the foregoing that the sealing rings 62, 63 may be replaced without removing the unit from the press by moving the housing 54 to the left as viewed in Fig. 3 to a position clear of the rings.

While a preferred form of the invention has been described in considerable detail it will be apparent that the invention is not limited to the construction shown or the uses referred to, and it is my intention to hereby cover all adaptations, modifications and changes which come within the practice of those skilled in the art to which the invention relates and the scope of the appended claims.

Having thus described my invention, I claim:

1. In a press or the like, a frame, a ram member to be reciprocated with respect to said frame, a drive shaft journalled in said frame and operatively connected to said ram member for reciprocating the ram member upon rotation of the drive shaft, said drive shaft having a removable shaft section and coupling means removably securing said section into said drive shaft as a part thereof, a flywheel journalled on said removable shaft section, fluid pressure actuated clutch means coaxial with said shaft section and connected to said flywheel at one side thereof for selectively connecting said flywheel to said shaft section, said shaft section and said drive shaft having aligned axial bores therein opening into adjacent ends of said shaft section and drive shaft for supplying fluid pressure to said clutch means and said coupling means including separable coupling members cooperating to connect said adjacent ends of said shaft section and said drive shaft and a sealing member having a central opening therethrough and extending between said adjacent ends and said bores to effect the connection of said bores, and brake means coaxial with and about said shaft section at the other side of said flywheel and removable with said shaft section, said brake means including a support member to be fixed with respect to said frame and means for detachably and fixedly connecting said support member to said frame.

2. In a press or the like, a frame, a ram member to be reciprocated with respect to said frame, a drive shaft having an axial bore journalled in said frame and operatively connected to said ram member for reciprocating the ram member upon rotation of the drive shaft, said drive shaft including a removable shaft section and coupling means detachably securing said shaft section into said drive shaft as a part thereof, a flywheel journalled on said shaft section, fluid pressure actuated clutch means coaxial with said shaft section at one side of said flywheel and removable with said shaft section for selectively connecting said flywheel to said shaft section, said clutch means comprising driving and driven elements relatively movable in directions axially of said shaft to engaged and disengaged positions, a cylindrical housing enclosing said elements and connected to said flywheel, said housing being coaxial with said shaft section and having a shaft opening through which said shaft section passes and a piston chamber coaxial with said shaft, a piston operable in said chamber for actuating said elements to at least one of said positions, said shaft section and said drive shaft having aligned axial bores for supplying fluid pressure to said chamber for operating said piston, and means for connecting the axial bore of said shaft section to the axial bore of said drive shaft comprising a cylindrical sleeve movable into one of said bores to a position where substantially the length of said sleeve is wherein said one bore, sealing means about the periphery of said sleeve for effecting a seal between said bores and the outside of said sleeve, and detachable means for limiting the movement of said sleeve into said one bore.

3. In a press or the like, a frame, a ram to be reciprocated with respect to said frame, a drive shaft journalled in said frame and operatively connected to said ram for reciprocating the ram upon rotation of the drive shaft, said drive shaft including a removable shaft section and coupling means detachably securing said shaft section into said drive shaft as a part thereof, a flywheel journalled on said shaft section and fluid pressure actuated clutch means coaxial with said shaft section at one side of said flywheel for drivingly connecting said flywheel to said shaft section comprising driving and driven elements relatively movable in directions axially of said shaft to engaged and disengaged positions, a cylindrical housing enclosing said elements and connected to said flywheel, said housing being coaxial with said shaft section and having a shaft opening therethrough for passing said shaft section and a piston chamber coaxial with said shaft, a piston operable in said chamber for actuating said elements to one of said positions, said shaft section and said drive shaft having aligned axial bores therein for supplying fluid pressure to said chamber for operating said piston, means for connecting the axial bore of said shaft section to the axial bore of said drive shaft comprising a cylindrical sleeve movable into one of said bores to a position where substantially the length of said sleeve is within said bore, sealing means about the periphery of said sleeve for effecting a seal between said one bore and said sleeve, and detachable means for limiting the movement of said sleeve into one of said bores, and a brake for braking said shaft section supported on and coaxial with said shaft section including a bracket member journaled on said shaft section and detachably connected to said frame.

4. In a press or the like, a frame, a ram member to be reciprocated with respect to said frame, a drive shaft journalled in said frame and operatively connected to said ram member for reciprocating the ram member upon rotation of the drive shaft, said drive shaft having a removable shaft section and coupling means removably securing said section into said drive shaft as a part thereof, a flywheel journalled on said removable shaft section, fluid pressure actuated clutch means coaxial with said shaft section and connected to said flywheel at one side thereof for selectively connecting said flywheel to said shaft section, said shaft section and said drive shaft having aligned axial bores therein for supplying fluid pressure to said clutch means and opening into adjacent ends of said shaft and shaft section and said coupling means including cooperating coupling members defining a tubular member for receiving said adjacent ends of said shaft and shaft section and a sealing sleeve extending between said adjacent ends and into said bores in said shaft and shaft section to effect a connection of said bores and movable into one of said bores in said shaft and shaft section to clear the other of said bores, and brake means coaxial with and about said shaft section at the other side of said flywheel and removable with said shaft section, said brake means including a support member to be fixed with respect to said frame and means for detachably and fixedly connecting said support member to said frame.

References Cited in the file of this patent

UNITED STATES PATENTS

| | | |
|---|---|---|
| 267,401 | Brislin | Nov. 14, 1882 |
| 2,023,597 | Klocke et al. | Dec. 10, 1935 |
| 2,313,187 | Williamson | Mar. 9, 1943 |
| 2,586,617 | Danly | Feb. 19, 1952 |
| 2,640,573 | Shenk | June 2, 1953 |
| 2,759,583 | Ward | Aug. 21, 1956 |